(12) United States Patent
McNeil

(10) Patent No.: US 6,467,306 B2
(45) Date of Patent: Oct. 22, 2002

(54) PROCESS AND APPARATUS FOR THE SEPARATION OF CARBON MONOXIDE AND HYDROGEN FROM A GASEOUS MIXTURE THEREOF

(75) Inventor: Brian Alfred McNeil, Chessington (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/020,557

(22) Filed: Dec. 14, 2001

(65) Prior Publication Data

US 2002/0116944 A1 Aug. 29, 2002

(30) Foreign Application Priority Data

Dec. 18, 2000 (EP) .............................................. 00311304

(51) Int. Cl.⁷ .................................................. F25J 3/00
(52) U.S. Cl. .............................. 62/622; 62/920; 62/932
(58) Field of Search ........................... 62/920, 931, 932, 62/620, 621, 622

(56) References Cited

U.S. PATENT DOCUMENTS 4,566,886 A   1/1986  Fabian et al. .................. 62/11
5,351,491 A   10/1994  Fabian et al. .................. 62/18
6,173,585 B1 * 1/2001  Billy et al. .................... 62/920

FOREIGN PATENT DOCUMENTS

DE          4210638      12/1991      ............. C01B/3/50

* cited by examiner

Primary Examiner—Ronald Capossela
(74) Attorney, Agent, or Firm—Keith D. Gourley

(57) ABSTRACT

A process and apparatus for separating carbon monoxide and hydrogen from a gaseous mixture thereof. The process comprises separating a cooled and partially condensed stream of feed gas comprising carbon monoxide and hydrogen into hydrogen-rich vapor and carbon monoxide-rich liquid. A portion of the carbon monoxide-rich liquid is at least partially stripped of hydrogen in a hydrogen stripping column, having an operating pressure below the feed pressure to produce hydrogen-stripped carbon monoxide liquid and hydrogen-enriched carbon monoxide vapor. A further portion of the carbon monoxide-rich liquid or a stream derived therefrom is vaporized to provide refrigeration for the feed gas. The vaporized carbon monoxide-rich liquid is compressed in a compressor to below the feed pressure, cooled and partially condensed by heat exchange and at least a portion is recycled to the hydrogen stripping column. A significant reduction (about 20%) in compression power requirement is observed when compared with equivalent prior art processes recycling a carbon monoxide-rich stream to the feed gas.

13 Claims, 2 Drawing Sheets

PROCESS AND APPARATUS FOR THE SEPARATION OF CARBON MONOXIDE AND HYDROGEN FROM A GASEOUS MIXTURE THEREOF

TECHNICAL FIELD OF THE INVENTION

The present invention relates to the cryogenic separation of a gaseous mixture comprising carbon monoxide and hydrogen into its component gases. The present invention has particular application in the separation of gaseous mixtures further comprising methane to produce carbon monoxide and a fuel gas comprising hydrogen and methane.

BACKGROUND TO THE INVENTION

There are many known processes for carrying out the cryogenic separation of gaseous mixtures comprising carbon monoxide and hydrogen. However, the difficulty confronting the gas production and separation industry is that a carbon monoxide-rich liquid that is used to provide refrigeration needs to be recycled in order to achieve an acceptable level of carbon monoxide recovery.

Once the carbon monoxide-rich stream has been used to provide refrigeration duty, it is usually compressed and recycled to the feed gas stream. For example, in DE-A-4210638 ("Fabian I"), a feed gas stream comprising carbon monoxide, hydrogen and methane is cooled and at least partially condensed by heat exchange and then separated into a hydrogen-rich stream and a carbon monoxide-rich stream comprising methane.

The hydrogen-rich stream is used to provide refrigeration duty by heat exchange against the feed gas stream and is further processed to produce a high purity stream of gaseous hydrogen. One portion of the carbon-monoxide stream has any remaining hydrogen stripped away and the resultant stripped stream separated into methane and high purity carbon monoxide. A further portion is used as a refrigerant stream to provide at least a portion of the refrigeration duty required to cool and at least partially condense the feed gas stream by heat exchange. The resultant vaporized refrigerant stream is then compressed and recycled to the feed gas stream.

U.S. Pat. No. 4,566,886 ("Fabian II") discloses a further process in which a gaseous mixture of hydrogen and carbon monoxide is separated into a hydrogen-rich vapor and a carbon monoxide-rich liquid. A portion of the carbon monoxide-rich liquid is used to provide refrigeration duty for the feed gas. The resultant carbon monoxide-rich vapor is recycled to the feed stream and compressed to the feed gas pressure. A further portion of the carbon monoxide-rich stream is used to provide heat exchange duty and is then "recycled" to a hydrogen-stripping column. The overall compression power requirement for this process is not substantially different from that Fabian I.

The main drawback of most prior art processes (including the Fabian processes) is the requirement that the recycle carbon monoxide stream is compressed to the pressure of the feed gas stream. The power requirement for compression of a recycle stream to the feed pressure is responsible for a substantial part of the overall operating costs of a separation plant. It is the primary objective of the present invention to develop a process for separating carbon monoxide and hydrogen from a gaseous mixture thereof in which the overall compression power requirement is reduced thereby reducing the operating and capital costs of the separation plant without a significant loss in efficiency.

SUMMARY OF THE INVENTION

It has been found that by compressing carbon monoxide-rich vapor and recycling it to the hydrogen-stripping column, it is no longer a requirement that the recycled vapor be compressed to the pressure of the feed gas stream. Instead, carbon monoxide-rich vapor is compressed to a pressure below the feed pressure. Processes according to the invention show a significant reduction to the compression power requirement and, thus, the overall operating and capital costs of a separation plant to run a process according to the present invention are reduced.

In particular, feed gas comprising carbon monoxide and hydrogen is cooled and partially condensed by heat exchange to produce cooled and partially condensed feed gas which is separated to produce a first hydrogen-rich vapor and a first carbon monoxide-rich liquid. A first stream of the first carbon monoxide-rich liquid is fed to a hydrogen stripping column having an operating pressure below the feed pressure. Hydrogen is at least partially stripped from the carbon monoxide-rich liquid to produce hydrogen-stripped carbon monoxide liquid and hydrogen-enriched carbon monoxide vapor. A second stream of the first carbon monoxide-rich liquid or a stream derived therefrom is vaporized to provide at least a portion of the refrigeration duty required to cool and partially condense the feed gas by heat exchange and produce carbon monoxide-rich vapor. The process is characterized in that the carbon monoxide-rich vapor is compressed to produce compressed carbon monoxide-rich vapor at a pressure below the feed pressure. The compressed carbon monoxide-rich vapor is cooled and at least partially condensed to produce cooled and at least partially condensed carbon monoxide-rich vapor, at least a portion of which is recycled to the hydrogen stripping column.

DETAILED DESCRIPTION OF THE INVENTION

Figure 1:
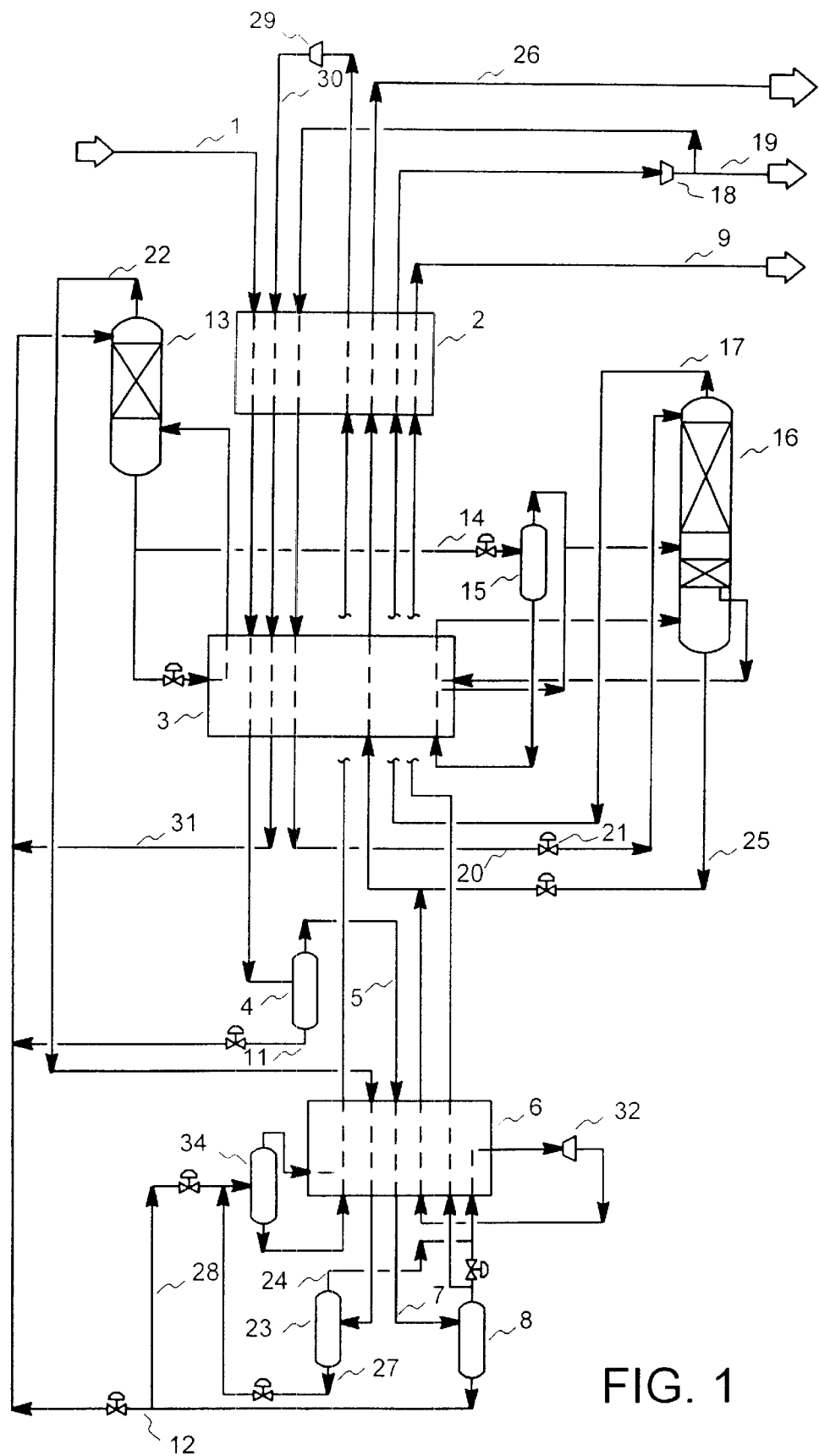
FIG. 1 is a flow sheet for a first embodiment of the present invention.

According to a first aspect of the present invention, there is provided a process for the separation of carbon monoxide and hydrogen from a gaseous mixture thereof, said process comprising:

cooling and partially condensing feed gas comprising carbon monoxide and hydrogen by heat exchange to produce cooled and partially condensed feed gas;

separating the cooled and partially condensed feed gas to produce a first hydrogen-rich vapor and a first carbon monoxide-rich liquid;

feeding a first stream of the first carbon monoxide-rich liquid to a hydrogen stripping column having an operating pressure below the feed pressure in which hydrogen is at least partially stripped from carbon monoxide-rich liquid to produce hydrogen-stripped carbon monoxide liquid and hydrogen-enriched carbon monoxide vapor; and vaporizing a second stream of the first carbon monoxide-rich liquid or a stream derived therefrom to provide at least a portion of the refrigeration duty required to cool and partially condense the feed gas by heat exchange and produce carbon monoxide-rich vapor; said process being characterized in that the carbon monoxide-rich vapor is compressed to produce compressed carbon monoxide-rich vapor at a pressure below the feed pressure, which is cooled and at least partially condensed to produce at least partially condensed carbon monoxide-rich vapor, at least a portion of which is recycled to the hydrogen stripping column.

Further adjustment of the pressure of the compressed carbon monoxide-rich vapor before recycling to the hydrogen stripping column is possible if required. However, it is preferred that the carbon monoxide rich vapor is compressed to substantially the operating pressure of the hydrogen-stripping column thereby avoiding the need for further pressure adjustment.

In preferred embodiments, the process further comprises;

cooling and partially condensing the hydrogen-enriched carbon monoxide vapor to produce cooled and partially condensed hydrogen-enriched carbon monoxide vapor;

separating the cooled and partially condensed hydrogen-enriched carbon monoxide vapor to produce a second hydrogen-rich vapor and a second carbon monoxide-rich liquid;

vaporizing at least a portion of the second carbon monoxide-rich liquid to provide a portion of the refrigeration duty required to cool and partially condense the hydrogen-enriched carbon monoxide vapor by heat exchange and recycling the resultant vaporized carbon monoxide-rich liquid to the hydrogen stripping column.

Preferably, the second carbon monoxide-rich liquid is combined with the second stream of the first carbon monoxide-rich liquid to provide a combined carbon monoxide-rich liquid that is vaporized to provide at least a portion of the refrigeration duty required to cool and partially condense both the hydrogen-enriched carbon monoxide vapor and the feed gas and the resultant vaporized combined carbon monoxide liquid is recycled to the hydrogen stripping column.

Refrigeration may be provided with liquid nitrogen which, when mixed with the hydrogen-enriched vapor, achieves a temperature that is substantially colder than the liquid nitrogen itself. Accordingly, the process may further comprise:

adding liquid nitrogen refrigerant to at least a portion of the second hydrogen-rich vapor to produce cooled hydrogen-rich refrigerant; and warming the cooled hydrogen-rich refrigerant to provide a portion of the refrigeration duty required to cool and partially condense the feed gas by heat exchange and produce a warmed hydrogen-rich vapor.

In this preferred embodiment, the warmed hydrogen-rich vapor may be combined with methane-rich liquid to produce a fuel stream which is further warmed by heat exchange to provide a fuel gas stream. The hydrogen-rich refrigerant may comprise a portion of the first hydrogen-rich vapor.

Alternatively, a portion of the refrigeration duty may be provided by work expansion. Preferably, the process further comprises combining at least a portion of the first hydrogen-rich vapor with at least a portion of the second hydrogen-rich vapor to produce a combined hydrogen-rich vapor; and work expanding the combined hydrogen-rich vapor to provide a portion of the refrigeration duty required to cool and partially condense the feed gas and produce expanded hydrogen-rich vapor.

Optionally, the combined hydrogen-rich vapor may be reheated by heat exchange prior to expansion in a turbine.

Preferably, the expanded hydrogen-rich vapor is combined with methane-rich liquid to produce a fuel stream which is further warmed by heat exchange to provide a fuel gas stream.

In preferred embodiments in which the hydrogen-stripped carbon monoxide liquid comprises methane, the process may further comprise separating said hydrogen-stripped carbon monoxide liquid in a separation column to produce carbon monoxide product vapor and methane-rich liquid. The carbon monoxide product vapor may then be warmed by heat exchange and compressed to produce compressed carbon monoxide product gas, a portion of which may be cooled and at least partially condensed by heat exchange and, following pressure adjustment, recycled to the separation column as reflux for the separation.

In these preferred embodiments, the methane-rich liquid may be combined with a second hydrogen-rich vapor derived from the hydrogen-enriched carbon monoxide vapor to produce a fuel stream.

The hydrogen-stripped carbon monoxide liquid may be phase separated to produce a gaseous stream and a liquid stream, said liquid stream being vaporized by heat exchange and the vaporized liquid stream being combined with the gaseous stream and the combined gaseous stream being fed to the separation column.

In a second aspect of the present invention, there is provided apparatus for separating carbon monoxide and hydrogen from a gaseous mixture thereof, said apparatus comprising:

first heat exchange means for cooling and partially condensing feed gas comprising carbon monoxide and hydrogen to produce cooled and partially condensed feed gas;

a separator for separating the cooled and partially condensed feed gas is to produce a first hydrogen-rich vapor and a first carbon monoxide-rich liquid;

conduit means for carrying the cooled and partially condensed feed gas from the first heat exchange means to the separator;

a hydrogen stripping column operating at a pressure below the feed pressure and for stripping hydrogen from carbon monoxide-rich liquid to produce a hydrogen-stripped carbon monoxide liquid and hydrogen-enriched carbon monoxide vapor;

conduit means for carrying a first stream of the carbon monoxide-rich liquid from the separator to the hydrogen-stripping column;

second heat exchange means for vaporizing carbon monoxide-rich liquid to provide at least a portion of the refrigeration duty required to cool and partially condense the feed gas and produce carbon monoxide-rich vapor;

conduit means for carrying a second stream of the carbon monoxide-rich liquid from the separator to the second heat exchange means;

a compressor for compressing the carbon monoxide-rich vapor to produce compressed carbon monoxide-rich vapor; and conduit means for carrying carbon monoxide-rich vapor from the second heat exchange means to the compressor; said apparatus being characterized in that the compressor compresses the carbon monoxide-rich vapor substantially to the operating pressure of the hydrogen stripping column and in that the apparatus further comprises:

third heat exchange means for cooling and at least partially condensing the compressed carbon monoxide-rich vapor to produce at least partially condensed carbon-monoxide-rich vapor;

conduit means for carrying compressed carbon monoxide-rich vapor from the compressor to the third heat exchange means; and conduit means for carrying at least a portion of the at least partially condensed carbon monoxide-rich vapor from the third heat exchange means to the hydrogen-stripping column.

Preferably, the apparatus is adapted to carry out any combination of the preferred features of the process described above.

Referring to FIG. 1, a feed gas stream 1 comprising hydrogen, carbon monoxide and methane is fed in turn to heat exchanger 2 and heat exchanger 3 in which it is cooled and partially condensed by heat exchange and the cooled and partially condensed feed gas stream is fed to a first separator 4 in which it is separated into a crude hydrogen-enriched feed gas and a crude carbon monoxide liquid. A stream 5 of the hydrogen-enriched feed gas is taken from the separator 4 and is further cooled and partially condensed in heat exchanger and the cooled and partially condensed hydrogen-enriched feed gas is fed as stream 7 to a second separator 8 where it is separated to produce a first hydrogen-rich vapor and a first carbon monoxide-rich liquid. A portion of the first hydrogen-rich vapor is warmed in heat exchangers 6, 2 and withdrawn as a hydrogen product gas stream 9. The remaining portion is used to provide refrigeration for the process (discussed below).

A stream 11 of the crude carbon monoxide-rich liquid from the first separator 4 and a portion 12 of the first carbon monoxide-rich liquid from the second separator 8 are reduced in pressure and introduced into a hydrogen stripping column 13 operating at a pressure below the feed pressure (and consisting of trays or packing) where hydrogen is stripped from carbon monoxide-rich liquid in order to achieve the required carbon monoxide product purity specification. The hydrogen-stripping column 13 is reboiled in heat exchanger 3.

A stream 14 of hydrogen-stripped carbon monoxide-rich liquid from the hydrogen stripping column 13 is flashed into a third separator 15 to produce a vapor portion and a liquid portion. The liquid portion is vaporized in heat exchanger 3 and the vaporized liquid, together with the vapor portion from the third separator 15 are combined and fed to a carbon monoxide/methane separation column 16 in which the combined stream is separated into a carbon monoxide product vapor stream 17 and a stream 25 of methane-rich liquid. The column 16 comprises trays or packing.

Carbon monoxide vapor from column 16 is withdrawn as stream 17 and warmed in heat exchanger 2. The warmed carbon monoxide vapor is compressed in a first compressor 18 and the bulk of the compressed carbon monoxide is withdrawn as product stream 19. A portion of the compressed carbon monoxide is cooled and condensed in heat exchangers 2 and 3 and is then fed as stream 20, via a control valve 21, to the separation column 16 to provide reflux. Column 16 is reboiled using heat exchanger 3.

A stream 22 of hydrogen-enriched carbon monoxide vapor is removed from the hydrogen stripping column 13, is cooled and partially condensed in heat exchanger 6 and is then fed to a fourth separator 23 where it is separated to produce a second hydrogen-rich vapor and a second carbon monoxide-rich liquid. The second hydrogen-rich vapor from the fourth separator 23 is withdrawn as stream 24 and added to the remaining portion of the first hydrogen-rich vapor. The combined hydrogen-rich vapor is work expanded in an expansion turbine 32 and the turbine exhaust stream is used to provide refrigeration duty for the feed gas. The exhaust stream is combined with the methane-rich liquid stream 25 and the combined stream warmed to provide a fuel gas stream 26.

A stream 27 of the second carbon monoxide-rich liquid from separator 23 is combined with a stream 28 of the first carbon monoxide-rich liquid from separator 8 after pressure reduction of both streams and the combined stream is separated 34 into a liquid phase stream and a vapor phase stream. These streams are fed to heat exchanger 6 where they are recombined. The recombined stream is vaporized to provide refrigeration for the hydrogen-enriched feed gas and the hydrogen-enriched carbon monoxide vapor in heat exchanger 6. The recombined stream is then warmed in heat exchanger 2 and compressed in a second compressor 29 to substantially the operating pressure of the hydrogen-stripping column 13. The pressurized stream 30 is then cooled and partially condensed in heat exchangers 2, 3 and the cooled and partially condensed stream 31 is recycled to the top of the hydrogen stripping column 13 for carbon monoxide recovery.

Figure 2:
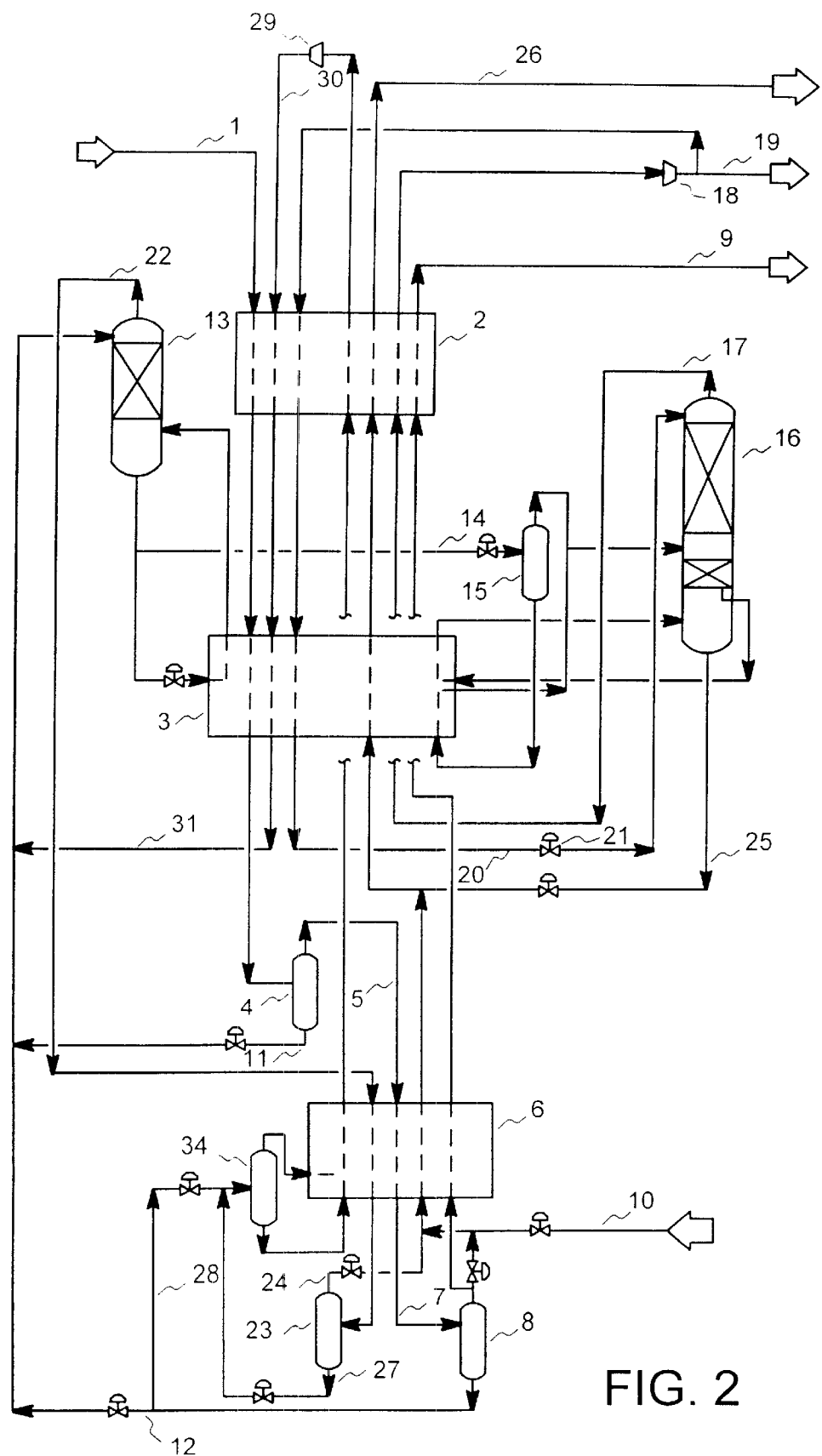
FIG. 2 is a flow sheet for a second embodiment of the present invention.

The second embodiment of the present invention depicted in the flow sheet of FIG. 2 differs from the first embodiment depicted in the flow sheet of FIG. 1 in that refrigeration duty provided by the combined hydrogen-rich vapor is not provided by expansion but by the addition of liquid nitrogen refrigerant.

In the second embodiment, the remaining portion of the first hydrogen-rich vapor from the second separator 8 is reduced in pressure and combined with a stream 10 of liquid nitrogen. A stream 24 of the second hydrogen-rich vapor from the fourth separator is reduced in pressure and combined with the hydrogen-rich vapor/liquid nitrogen stream to produce a stream that provides refrigeration duty in heat exchanger 6 for the feed gas. After leaving heat exchanger 6, the combined hydrogen-rich vapor stream is combined with methane-rich liquid stream 25 and the combined stream is then warmed to produce the fuel gas stream 26.

The following Table 1 summarizes the mass balance for each stream referred to in the flow sheet of FIG. 2.

| Stream | | 1 | 5 | 7 | 9 | 10 | 11 | 12 | 14 | 17 | 19 |
|---|---|---|---|---|---|---|---|---|---|---|---|
| Pressure | bar abs | 23.1 | 22.5 | 22.2 | 21.7 | 3.8 | 22.5 | 22.2 | 9.7 | 7.2 | 13.4 |
| | (MPa) | (2.31) | (2.25) | (2.22) | (2.17) | (0.38) | (2.25) | (2.22) | (6.97) | (0.72) | (1.34) |
| Temperature | ° C. | 35.0 | −168.1 | −191.9 | 33.9 | −182.5 | −168.1 | −191.9 | −164.5 | −169.2 | 36.0 |
| Flowrate | kgm/h | 100.0 | 80.5 | 80.5 | 1.5 | 0.8 | 19.5 | 2.8 | 48.6 | 68.4 | 47.3 |
| Vapor fraction | mol % | 1.0 | 1.0 | 60.7 | 1.0 | 0.0 | 0.0 | 0.0 | 0.0 | 1.0 | 1.0 |
| Hydrogen | mol % | 47.75 | 58.32 | 58.32 | 93.09 | | 4.27 | 4.55 | 0.00 | 0.00 | 0.00 |
| Nitrogen | mol % | 0.25 | 0.22 | 0.22 | 0.06 | 100.00 | 0.36 | 0.48 | 0.45 | 0.46 | 0.46 |
| Carbon monoxide | mol % | 51.20 | 41.20 | 41.20 | 6.84 | | 92.34 | 94.34 | 97.92 | 99.53 | 99.53 |
| Methane | mol % | 0.79 | 0.25 | 0.25 | 0.00 | | 0.30 | 0.63 | 1.63 | 0.00 | 0.00 |

-continued

| Stream | | 20 | 22 | 24 | 25 | 26 | 27 | 28 | 30 | 31 |
|---|---|---|---|---|---|---|---|---|---|---|
| Pressure | bar abs | 12.0 | 9.7 | 9.3 | 7.3 | 2.8 | 9.3 | 22.2 | 10.9 | 10.3 |
| | (MPa) | (1.20) | (0.97) | (0.93) | (0.73) | (0.28) | (0.93) | (2.22) | (1.09) | (1.03) |
| Temperature | °C. | −168.1 | −169.7 | −192.2 | −155.9 | 33.9 | −192.2 | −191.9 | 36.0 | −168.1 |
| Flowrate | kgm/h | 21.1 | 9.7 | 2.6 | 1.2 | 52.0 | 7.1 | 28.8 | 35.9 | 35.9 |
| Vaporfraction | mol % | 0.0 | 1.0 | 1.0 | 0.0 | 1.0 | 0.0 | 0.0 | 1.0 | 15.8 |
| Hydrogen | mol % | 0.00 | 24.78 | 87.98 | 0.00 | 89.19 | 1.82 | 4.55 | 4.01 | 4.01 |
| Nitrogen | mol % | 0.46 | 0.50 | 0.14 | 0.03 | 1.61 | 0.63 | 0.48 | 0.51 | 0.51 |
| Carbon monoxide | mol % | 99.53 | 74.52 | 11.87 | 36.20 | 7.68 | 97.28 | 94.34 | 94.92 | 94.92 |
| Methane | mol % | 0.00 | 0.19 | 0.00 | 63.76 | 1.52 | 0.26 | 0.63 | 0.55 | 0.55 |

Modeling studies have shown that there is a significant reduction (about 20%) in the overall compression power requirement of processes according to the present invention when compared with corresponding prior art processes in which the recycled carbon monoxide streams are compressed to the feed gas pressure. Typically, the second compressor 29 is reduced from a 3- or 4-stage reciprocating compressor to a 3-stage centrifugal compressor, with reduced maintenance requirements. For the particular embodiments shown, the first compressor 18 is a single stage centrifugal machine which is combined with the second compressor 29 as a single 4-stage machine.

The process of the present invention reduces the cost and improves the efficiency of cryogenic carbon monoxide/hydrogen separation in a partial condensation cycle by using a low-pressure recycle of carbon monoxide-rich liquid. In addition, the level of carbon monoxide recovery may be improved by the partial condensation of the hydrogen stripper column overhead vapor.

It will be appreciated that the invention is not restricted to the details described above with reference to the preferred embodiments but that numerous modifications and variations can be made without departing from the spirit or scope of the invention as defined in the following claims.

What is claimed is:

1. In a process for the separation of carbon monoxide and hydrogen from a gaseous mixture thereof, said process comprising:

cooling and partially condensing feed gas comprising carbon monoxide and hydrogen by heat exchange to produce cooled and partially condensed feed gas;

separating the cooled and partially condensed feed gas to produce a first hydrogen-rich vapor and a first carbon monoxide-rich liquid;

feeding a first stream of the first carbon monoxide-rich liquid to a hydrogen stripping column having an operating pressure below the feed pressure and in which hydrogen is at least partially stripped from carbon monoxide-rich liquid to produce hydrogen-stripped carbon monoxide liquid and hydrogen-enriched carbon monoxide vapor; and vaporizing a second stream of the first carbon monoxide-rich liquid or a stream derived therefrom to provide at least a portion of the refrigeration duty required to cool and partially condense the feed gas by heat exchange and produce carbon monoxide-rich vapor, the improvement consisting of compressing the carbon monoxide-rich vapor to produce compressed carbon monoxide-rich vapor at a pressure below the feed pressure, cooling and at least partially condensing said compressed carbon monoxide-rich vapor to produce at least partially condensed carbon monoxide-rich vapor and recycling at least a portion of said at least partially condensed carbon monoxide-rich vapor to the hydrogen stripping column.

2. The process according to claim 1 further comprising;

cooling and partially condensing the hydrogen-enriched carbon monoxide vapor to produce cooled and partially condensed hydrogen-enriched carbon monoxide vapor;

separating the cooled and partially condensed hydrogen-enriched carbon monoxide vapor to produce a second hydrogen-rich vapor and a second carbon monoxide-rich liquid;

vaporizing at least a portion of the second carbon monoxide-rich liquid to provide a portion of the refrigeration duty required to cool and partially condense the hydrogen-enriched carbon monoxide vapor by heat exchange and recycling the resultant vaporized carbon monoxide-rich liquid to the hydrogen stripping column.

3. The process according to claim 2 wherein the second carbon monoxide-rich liquid is combined with the second stream of the first carbon monoxide-rich liquid to provide a combined carbon monoxide-rich liquid that is vaporized to provide at least a portion of the refrigeration duty required to cool and partially condense both the hydrogen-enriched carbon monoxide vapor and the feed gas and the resultant vaporized combined carbon monoxide liquid is recycled to the hydrogen stripping.

4. The process according to claim 2 further comprising:

adding liquid nitrogen refrigerant to the second hydrogen-rich vapor to produce cooled hydrogen-rich refrigerant; and vaporizing the cooled hydrogen-rich refrigerant to provide a portion of the refrigeration duty required to cool and partially condense the feed gas by heat exchange and produce a warmed hydrogen-rich vapor.

5. The process according to claim 4 wherein the warmed hydrogen-rich vapor is combined with methane-rich liquid to produce a fuel stream which is further warmed by heat exchange to provide a fuel gas stream.

6. The process according to claim 4 wherein the hydrogen-rich refrigerant comprises a portion of the first hydrogen-rich vapor.

7. The process according to claim 2 further comprising:

combining at least a portion of the first hydrogen-rich vapor with at least a portion of the second hydrogen-rich vapor to produce a combined hydrogen-rich vapor; and work expanding the combined hydrogen-rich vapor to provide a portion of the refrigeration duty required to cool and partially condense the feed gas and produce expanded hydrogen-rich vapor.

8. The process according to claim 7 wherein the expanded hydrogen-rich vapor is combined with methane-rich liquid to produce a fuel stream which is further warmed by heat exchange to provide a fuel gas stream.

9. The process according to claim 1 wherein the hydrogen-stripped carbon monoxide liquid comprises methane, said process further comprising separating said hydrogen-stripped carbon monoxide liquid in a separating column to produce carbon monoxide product vapor and methane-rich liquid.

10. The process according to claim 9 wherein the carbon monoxide product vapor is warmed by heat exchange and compressed to produce compressed carbon monoxide product gas, a portion of which is cooled and at least partially condensed by heat exchange and, following pressure adjustment, recycled to the separation column as reflux for the separation.

11. The process according to claim 9 wherein at least a portion of the methane-rich liquid is combined with a hydrogen-rich vapor derived from the hydrogen-enriched carbon monoxide-rich vapor from the hydrogen-stripping column to produce a fuel stream.

12. The process according to claim 9 wherein the hydrogen-stripped carbon monoxide liquid is phase separated to produce a gaseous stream and a liquid stream, said liquid stream being vaporized by heat exchange and the vaporized liquid stream being combined with the gaseous stream and the combined gaseous stream being fed to the separator column.

13. Apparatus for separating carbon monoxide and hydrogen from a gaseous mixture thereof, said apparatus comprising:

first heat exchange means for cooling and partially condensing feed gas comprising carbon monoxide and hydrogen to produce cooled and partially condensed feed gas;

a separator for separating the cooled and partially condensed feed gas to produce a first hydrogen-rich vapor and a first carbon monoxide-rich liquid;

conduit means for carrying the cooled and partially condensed feed gas from the first heat exchange means to the separator;

a hydrogen stripping column, having an operating pressure below the feed pressure, for stripping hydrogen from carbon monoxide-rich liquid to produce a hydrogen-stripped carbon monoxide liquid and hydrogen-enriched carbon monoxide vapor;

conduit means for carrying a first stream of the carbon monoxide-rich liquid from the separator to the hydrogen stripping column;

second heat exchange means for vaporizing carbon monoxide-rich liquid to provide at least a portion of the refrigeration duty required to cool and partially condense the feed gas and produce carbon monoxide-rich vapor;

conduit means for carrying a second stream of the carbon monoxide-rich liquid from the separator to the second heat exchange means;

a compressor for compressing the carbon monoxide-rich vapor to produce compressed carbon monoxide-rich vapor; and conduit means for carrying carbon monoxide-rich vapor from the second heat exchange means to the compressor;

wherein the compressed carbon monoxide-rich vapor is at a pressure below the feed pressure and the apparatus further comprises:

third heat exchange means for cooling and at least partially condensing the compressed carbon monoxide-rich vapor to produce at least partially condensed carbon-monoxide-rich vapor;

conduit means for carrying compressed carbon monoxide-rich vapor from the compressor to the third heat exchange means ; and conduit means for carrying at least a portion of the at least partially condensed carbon monoxide-rich vapor from the third heat exchange means to the hydrogen-stripping column.

* * * * *